US010270953B2

United States Patent
Bradley et al.

(10) Patent No.: US 10,270,953 B2
(45) Date of Patent: Apr. 23, 2019

(54) ANONYMOUS ELECTRONIC COMMUNICATION WITH THE OWNER OF PHYSICAL PROPERTY

(71) Applicant: International Business Machines Corporation, Armonk, NY (US)

(72) Inventors: Lisa M. Bradley, Cary, NC (US); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 15/283,916

(22) Filed: Oct. 3, 2016

(65) Prior Publication Data

US 2018/0097985 A1  Apr. 5, 2018

(51) Int. Cl.
*H04W 4/80* (2018.01)
*H04L 29/08* (2006.01)
*H04N 5/232* (2006.01)

(52) U.S. Cl.
CPC ......... *H04N 5/23206* (2013.01); *H04L 67/20* (2013.01); *H04W 4/80* (2018.02)

(58) Field of Classification Search
CPC ..... H04W 12/02; H04W 12/06; H04W 12/08; H04W 12/12; H04W 88/02; H04W 4/008; H04N 5/23203; H04N 5/23293
USPC ........................................................ 455/410
See application file for complete search history.

(56) References Cited

U.S. PATENT DOCUMENTS

| 8,655,311 | B2 | 2/2014 | Shaw | |
|---|---|---|---|---|
| 8,750,514 | B2 | 6/2014 | Callo et al. | |
| 9,305,283 | B1* | 4/2016 | Lauka | G06Q 10/087 |
| 2011/0195701 | A1* | 8/2011 | Cook | G01S 5/0018 |
| | | | | 455/422.1 |
| 2013/0065523 | A1* | 3/2013 | Yun | H04M 1/7253 |
| | | | | 455/41.1 |
| 2013/0146655 | A1 | 6/2013 | Gandhi | |
| 2015/0081815 | A1 | 3/2015 | Rhim | |
| 2015/0181169 | A1* | 6/2015 | Kim | H04N 5/265 |
| | | | | 348/143 |
| 2015/0287304 | A1 | 10/2015 | Valiulis | |
| 2015/0304802 | A1 | 10/2015 | Gundam et al. | |
| 2015/0334994 | A1 | 11/2015 | Prasad | |
| 2016/0119579 | A1 | 4/2016 | Sakai | |
| 2016/0239733 | A1* | 8/2016 | Hertz | G06F 17/30887 |
| 2016/0241660 | A1* | 8/2016 | Nhu | H04L 67/26 |

OTHER PUBLICATIONS

"What is NFC?," rotasNFC, Rotas Italia, Jul. 2016, 2 pages.

* cited by examiner

*Primary Examiner* — Kamran Afshar
*Assistant Examiner* — Nicole M Louis-Fils
(74) *Attorney, Agent, or Firm* — VanLeeuwen & VanLeeuwen; David B. Waycechowsky

(57) ABSTRACT

An approach is provided in which a mobile device receives a first message from an electronic tag that includes a computer network address and also a unique property identifier corresponding to a physical property. The mobile device activates a camera in response to receiving the first message and, in turn, transmits a second message to the computer network address that includes the unique property identifier and an image captured by the activated camera.

10 Claims, 7 Drawing Sheets

| MAPPING TABLE 340 | | |
|---|---|---|
| ACCOUNT OWNER | PROPERTY DESCRIPTION | UNIQUE PROPERTY ID |
| Bill Smith, 512-555-1414 | 101 Main Street Apt A | BS451 |
| | 101 Main Street Apt B | BS864 |
| | 2012 F-250 Truck | BS784 |
| | 432 Carolina Way | BS364 |
| ... | ... | ... |

ANONYMOUS ELECTRONIC COMMUNICATION WITH THE OWNER OF PHYSICAL PROPERTY

BACKGROUND

A bystander may wish to contact an owner of a property to inform the owner of a potential issue with the property, such as a broken window, open gate, etc. If the bystander knows the property owner, the bystander may have the property owner's contact information and contact the property owner directly. However, when the bystander does not know the property owner, or know how to contact the property owner, the bystander may have difficulty informing the property owner of the property issue. For example, the bystander may have opened their car door in a parking lot and dented an adjacent vehicle. Today, the bystander would typically leave a note on the vehicle windshield with the bystander's information. However, rain or wind is present, the bystander may not have a way to contact the vehicle owner other than to wait for the vehicle owner to return to the vehicle.

In time-sensitive situations, the bystander may need to notify the property owner immediately. For example, a bystander may be walking in a neighborhood and notice that a property owner's electric gate remained in an open position and the property owner's dog is in the yard. The bystander may not know the property owner and, in turn, may have to knock on neighbors' doors until the bystander is able to provide a message to the property owner.

BRIEF SUMMARY

According to one embodiment of the present disclosure, an approach is provided in which a mobile device receives a first message from an electronic tag that includes a computer network address and a unique property identifier corresponding to a physical property. The mobile device activates a camera in response to receiving the first message and, in turn, transmits a second message to the computer network address that includes the unique property identifier and an image captured by the activated camera.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting a mapping table that maps a near field communication (NFC) tag's unique property identifier (ID) to a property owner's contact information;

DETAILED DESCRIPTION

Figure 1:
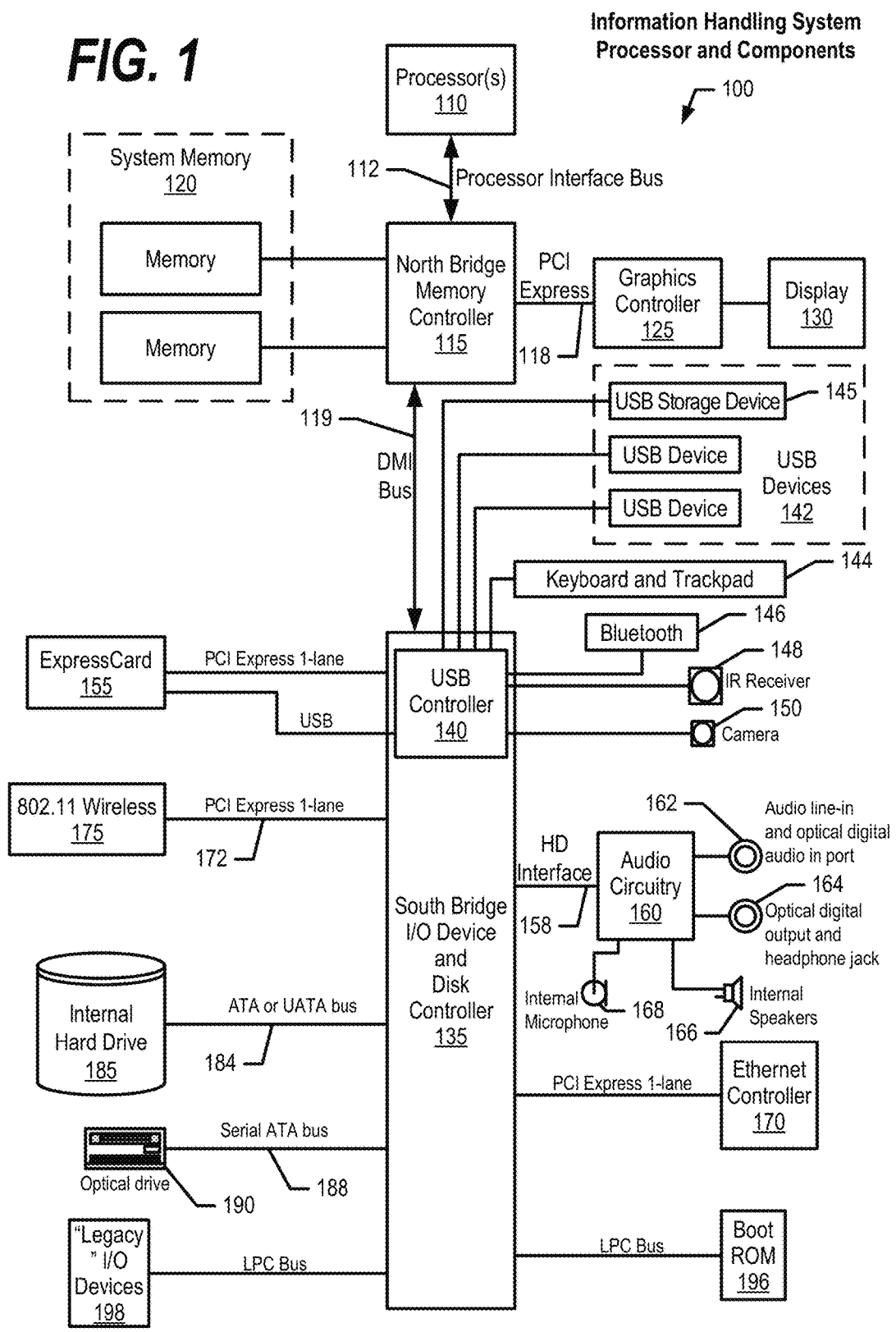
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
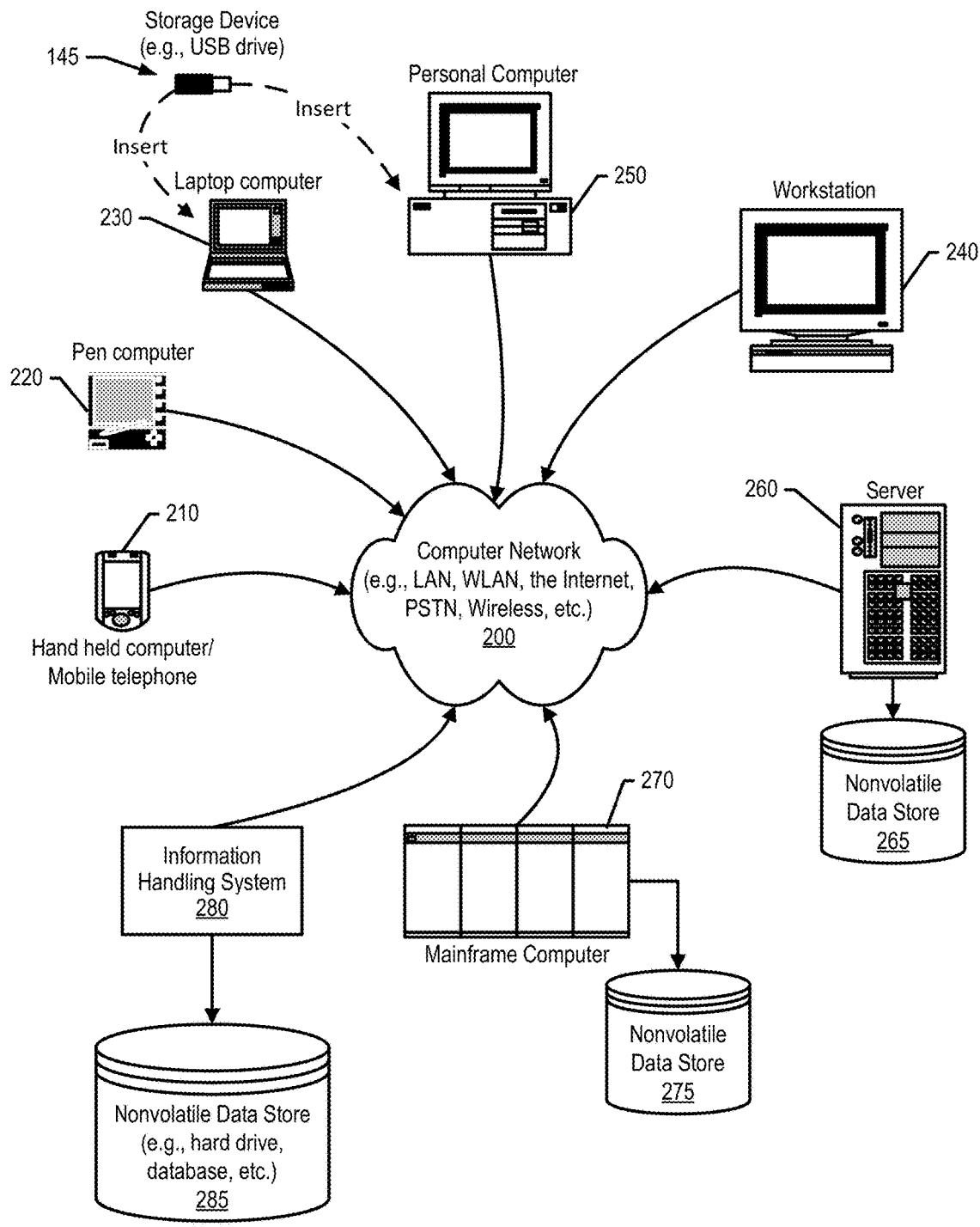
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 depict an approach that can be executed on an information handling system to expedite anonymous communication between a bystander and an owner of physical property (e.g. a car, home, boat, laptop computer, etc.). The information handling system includes a third party gateway system that allows a property owner to create an account and register the property owner's physical property. In turn, in one embodiment, the third party gateway system configures electronic tags, such as NFC (near field communication) tags, with unique property identifiers (IDs) and the third party gateway system's computer network address (e.g., universal resource locator (URL), internet protocol (IP) address, etc.). The third party gateway system sends the NFC tags to the property owner and the property owner affixes the NFC tags to the physical properties or in proximity to the physical properties, such as on a vehicle windshield or on a curbside placard.

Then, when a bystander identifies an issue with the property and wishes to send a message to the property owner, the bystander places the bystander's mobile device in close proximity to the NFC tag. The NFC tag energizes and sends an NFC message back to the bystander's mobile device that includes the unique property ID and the third party computer network address. The bystander's camera is activated in response to receiving the NFC message and the mobile device captures image data (picture, video, etc.). For example, the bystander may take an image of the physical property, the NFC tag, a personal photo, etc., and may also include a note to the property owner.

In turn, the bystander's mobile device sends a message to the third party gateway system that includes the unique property ID, the image data, and the bystander's note if applicable. The third party gateway system maps the unique property ID to the property owner's contact information and sends a message to the property owner. The property owner, in turn, may send a response through the third party gateway system back to the bystander. As a result, communication between the bystander and the property owner remains anonymous unless either party chooses to provide contact information.

Figure 3:
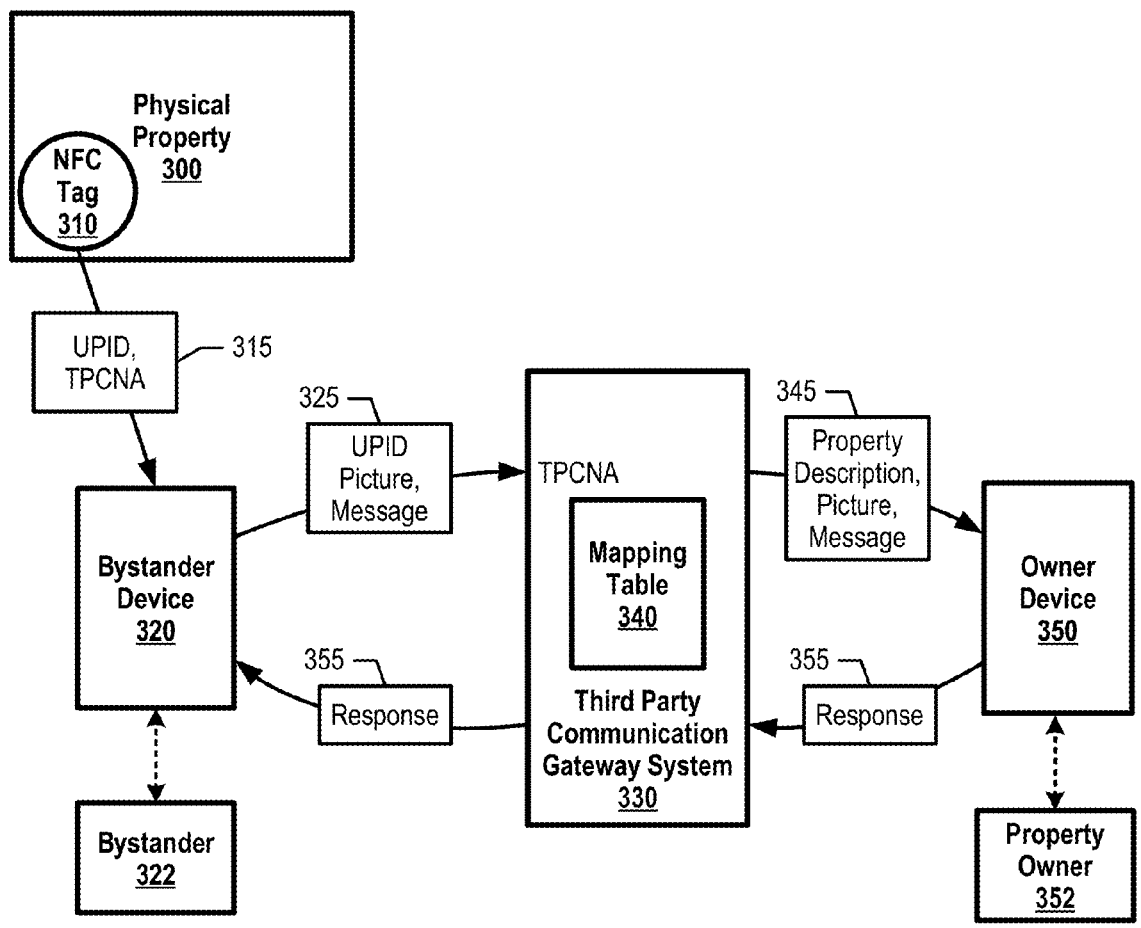
FIG. 3 is a diagram depicting a bystander anonymously notifying a property owner of an issue relating to a physical property.

FIG. 3 is a diagram depicting a bystander anonymously notifying a property owner of an issue relating to a physical property. Physical property 300 may be a house, vehicle, electronic device, or other entity that is owned by an individual or company. Property owner 352 registers with third party communication gateway system 330 and receives an electronic tag, such as Near Field Communication (NFC) tag 310, to affix to physical property 300, or to affix to a placard in proximity to physical property 300 (see FIG. 6 and corresponding text for further details). Third party communication gateway system 330 stores an entry in mapping table 340 that maps NFC tag 310's unique property ID (UPID) to property owner 352's contact information (owner device 350). Third party communication gateway system 330 also stores a third party computer network address (TPCNA) in NFC tag 310 that corresponds to third party communication gateway system 330 (e.g., universal resource locator (URL), internet protocol (IP) address, etc.).

In one embodiment, NFC tag 310 may be a type of passive device without source power, which utilizes a wireless technology to transfer data to another NFC enabled device. NFC tag 310 includes small microchips with little aerials that store a small amount of information for transfer to another NFC device. In this embodiment, NFC tag 310 is energized through magnetic induction when an NFC enabled device (bystander device 320) is in close proximity to NFC tag 310 and sends a query signal.

Bystander 322 notices an issue with physical property 300 and places bystander device 320 in close proximity to NFC tag 310. In one embodiment, NFC tag 310 is affixed to physical property 300. In another embodiment, NFC tag 310 may be affixed to a sign corresponding to property, such as on a sidewalk or outside a perimeter fence. In this embodiment, the sign may indicate that a feature is available to anonymously contact the property owner. In yet another embodiment, the sign may indicate the ability to contact other facility personnel, such as at a zoo, a museum, a property management company, or other public facilities.

Bystander device 320 transmits a query signal that energizes NFC tag 310. In turn, NFC tag 310 sends message 315 to bystander device 320 that includes the unique property ID (UPID) corresponding to physical property 300, the third party computer network address (TPCNA) corresponding to third party communication gateway system 330, and may also include an instruction for bystander device 320 to activate its camera.

Bystander device 320 opens a user interface window for bystander 322 to accept activation of the camera and, in turn, bystander 322 captures an image of physical property 300, such as a broken window, and may also include an image of NFC tag 310 and/or an image of bystander 322. Bystander device 320 may also display optional fields for the bystander to enter a note or contact information (see FIG. 5 and corresponding text for further details). Bystander device 320 then sends message 325 to third party communication gateway system 330 via the third party computer network address.

Third party communication gateway system 330 receives message 325 and uses mapping table 340 to map the unique property ID to the property owner's contact information. Third party community gateway system 330 then sends message 345 to the property owners device 350 that includes the image data, and may also include a note generated by bystander 322 and/or a property description from mapping table 340 such as "100 Main Street, Apartment 1B."

Owner device 350 displays the message to property owner 352 for property owner 352 to take action. In one embodiment, property owner 352 may send a response 355 to bystander 322, such as "thank you" or "please provide more information." Third party communication gateway system 330 receives response 355 and forwards response 355 to bystander device 320. In this embodiment, third party communication gateway system 330 may temporarily store bystander device 320's phone number in case owner device 350 sends a response messages. In this embodiment, however, no personal information is shared between bystander 320 and owner device 350 to main bilateral anonymity unless specifically provided by either party.

In one embodiment, third party communication gateway system 330 may provide a method for property owner 352 to flag received messages as offensive or to report abuse from a bystander. In this embodiment, the bystander's mobile device may be blocked from utilizing the service with the current owner or other users if certain thresholds are exceeded.

FIG. 4 is an exemplary diagram depicting a mapping table that maps a near field communication (NFC) tag's unique property identifier (ID) to a property owner's contact information. Third party communication gateway system 330 generates entries in mapping table 340 based on registration and configuration information received from property owners. The example in FIG. 4 shows that "Bill Smith" (column 400) requested four NFC tags for four physical properties. In the embodiment shown in FIG. 4, Bill Smith provided property descriptions (column 410) and third party communication gateway system 330 (or other entity) configured NFC tags with unique property IDs (column 420) and sent the NFC tags to Bill Smith. In turn, Bill Smith affixed the NFC tags to their corresponding property items.

Figure 5:
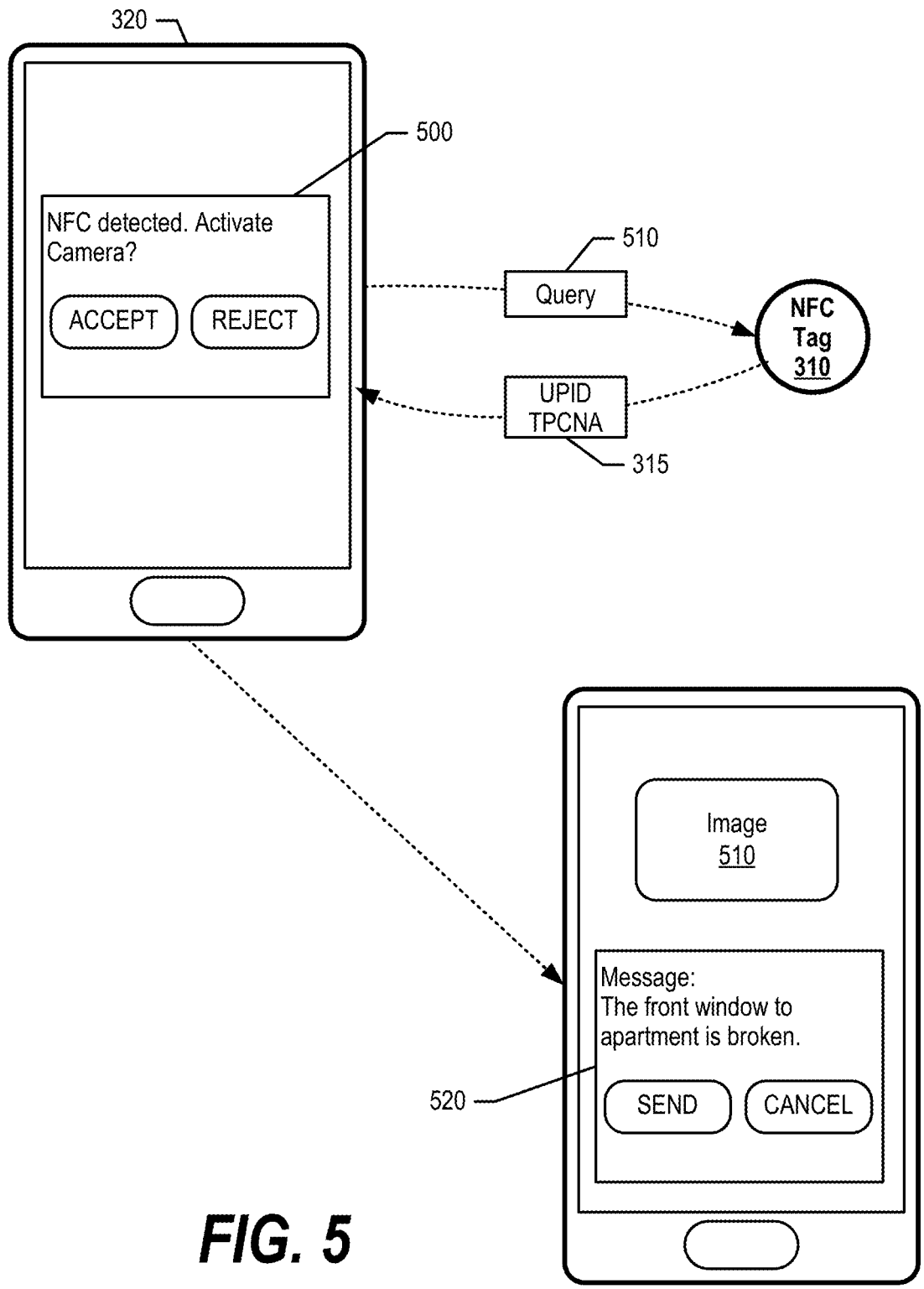
FIG. 5 is an exemplary diagram showing a mobile device energizing an electronic tag and receiving a message from the energized electronic tag.

FIG. 5 is an exemplary diagram showing a bystander device energizing an electronic tag and receiving a message from the energized electronic tag. A bystander places bystander device 320 in proximity to NFC tag 310. In one embodiment, bystander device 320 transmits query 510 to energize proximate NFC tags. When NFC tag 310 receives query 510 and energizes, NFC tag 310 transmits message 315, which includes a unique property ID (UPID) and a third party computer network address (TPCNA) as discussed herein.

Bystander device 320 receives message 315 and opens window 500 to the bystander. This allows the bystander to accept the activation of bystander device 320's camera. Once the bystander captures image data using the activated camera (image 510), device 320 displays window 520, which allows the bystander to include a more detailed note. In one embodiment, the bystander may also take an image of himself/herself and also provide contact information for the property owner to contact the bystander directly. In turn, device 320 transmits a message that includes the image data to the third party computer network address included in message 315.

Figure 6:
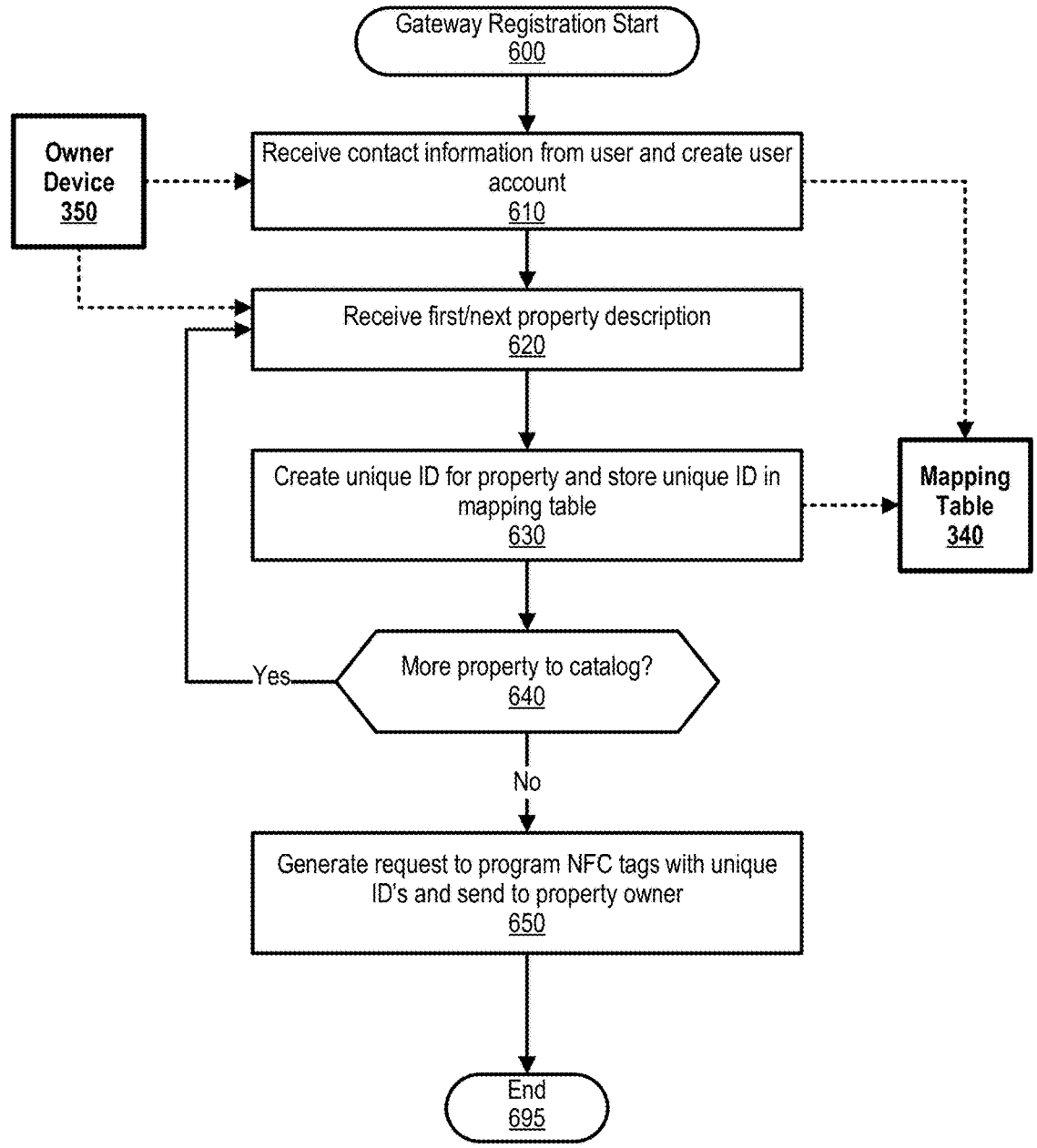
FIG. 6 is an exemplary diagram depicting steps taken by a third party communication gateway system to register a property owner and configure NFC tags corresponding to the property owner's property.

FIG. 6 is an exemplary diagram depicting steps taken by a third party communication gateway system to register a property owner and configure NFC tags corresponding to the property owner's property. Processing commences at 600 whereupon, at step 610, the process receives contact information from the property owner via owner device 350, such as the owner's name and cell phone number. The process creates a user account entry in mapping table 340.

At step 620, the process receives the first property description from owner device 350, such as "2012 F-250 Truck." The process, at step 630, creates a unique property ID for the property and stores the unique property ID and property description in a mapping entry in mapping table 340 (see FIG. 4 and corresponding text for further details). The process determines as to whether the owner wishes to register more physical property to the property owner's account, such as a residence, boat, etc. (decision 640).

If the user wishes to register more physical property to the property owner's account, then decision 640 branches to the 'yes' branch, whereupon the process loops back to process the next property. This looping continues until the user is finished registering property, at which point decision 640 branches to the 'no' branch.

At step 650, the process generates a request (e.g., to a customer support department) to program NFC tags with the unique property ID's assigned in step 630, along with the third party communication gateway system's third party computer network address. The third party communication gateway system sends the programmed NFC tags to the property owner and the property owner affixes the NFC tags to the corresponding properties or signs in proximity to the properties. In one embodiment, the third party communication gateway system adds the property descriptions on the NFC tags or paperwork included in the NFC tags so that the property owner knows which NFC tag corresponds to which property. FIG. 6 processing thereafter ends at step 695.

Figure 7:
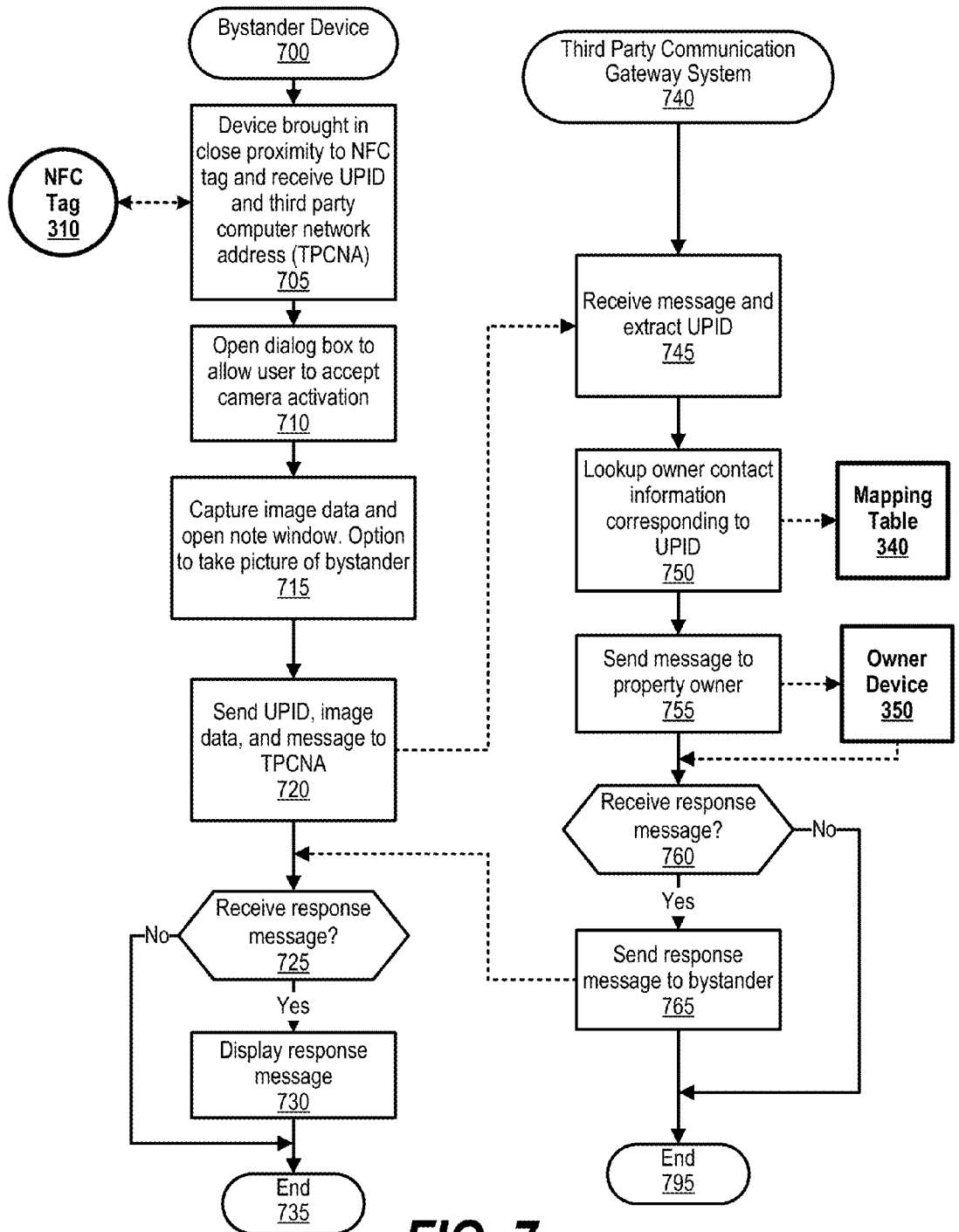
FIG. 7 is an exemplary flowchart showing steps taken by a bystander device to send an anonymous message and receive a response to/from a property owner through a third party communication gateway system.

FIG. 7 is an exemplary flowchart showing steps taken by a bystander device to send an anonymous message and receive a response to/from a property owner through a third party communication gateway system.

Bystander device processing commences at 700 whereupon, at step 705, the bystander places the bystander device in close proximity to NFC tag 310. The bystander device transmits a query signal that, as discussed earlier, energizes NFC tag 310's circuitry. In turn, NFC tag 310 transmits an NFC message to the bystander device that includes NFC tag 310's unique property ID and a third party computer network address.

At step 710, the device opens a dialog box to the bystander that allows the bystander to accept an activation of the bystander device's camera. In one embodiment, the bystander device includes an application that detects the NFC message, displays the dialog box, and activates the camera when the bystander allows the camera activation. Once the bystander allows activation of the camera, the bystander, at step 715, uses the camera to capture image data, such as capturing an image/video of the physical property and, in one embodiment, may also take an image of the bystander if the bystander does not wish to remain anonymous. The bystander device also allows the bystander to enter a note to the property owner, such as details regarding the physical property or the bystander's contact information.

At step 720, the bystander device sends the unique property ID, the image data, and the bystander note to the third party computer network address, which may be a URL address, an IP address, or other type of computer network-based address. Third party communication gateway system processing commences at 740 whereupon, at step 745, the third party communication gateway system receives the message from the bystander device and extracts the unique property ID included in the message.

The third party communication gateway system uses mapping table 340 to match the unique property ID to a property owner at step 750. At step 760, the third party communication gateway system sends a message to the property owner via owner device 350 that includes, for example, the property description, image data captured by the bystander, and a note from the bystander.

The third party communication gateway system determines whether the property owner wishes to send a response message via owner device 350 (decision 760). If the property owner sent a response message, then decision 760 branches to the 'yes' branch whereupon the third party communication gateway system sends the response back to the bystander device at step 765. In one embodiment, the third party communication gateway system maintains a list of bystander device numbers to send responses back to the bystander.

On the other hand, if the property owner did not send a response message, decision 760 branches to the 'no' branch and bypasses step 765. In one embodiment, the property owner may indicate that the bystander is a malicious user and sending malicious messages. In this embodiment, the third party communication gateway system may add the bystander's information (cell phone number) to a black list and ignore future messages from the bystander. Gateway processing ends at 795.

Referring back to the bystander device, the bystander device determines whether a response message is received (decision 725). If the bystander device receives a response message, decision 725 branches to the 'yes' branch whereupon the bystander device displays the response message to the bystander (step 730). On the other hand, if the bystander device did not receive a response message, decision 725 branches to the 'no' branch bypassing step 730. Bystander device processing ends at 735.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   transmitting a single query signal from a mobile device to an electronic tag that corresponds to a physical property, wherein the single query signal activates the electronic tag;
   in response to transmitting the single query signal, receiving, at the mobile device, a first electronic message from the activated electronic tag, wherein the first electronic message includes a computer network address and also includes a unique property identifier corresponding to the physical property;
   receiving a note from a bystander through a user interface window on the mobile device;
   activating a camera on the mobile device in response to receiving the first message;
   transmitting a second message from the mobile device to the computer network address included in the first electronic message, wherein the second message includes the unique property identifier, the note, and image data captured by the activated camera;
   receiving the second message at a third party communication gateway system that corresponds to the computer network address;
   identifying, by the third party communication gateway system, an owner of the physical property that corresponds to the unique property identifier; and
   sending a third message from the third party communication gateway system to the owner that includes the image data and a property description corresponding to the physical property.

2. The method of claim 1 further comprising:
   receiving a response from the owner of the physical property at the third party communication gateway system; and
   sending the response to the mobile device, wherein the third message and the response are both bilaterally anonymous between the bystander that operates the mobile device and the owner of the physical property.

3. The method of claim 1 wherein:
   the electronic tag is a near field communication (NFC) tag that is energized through magnetic induction from a the single query signal generated by the mobile device when the mobile device is placed in proximity to the NFC tag; and
   the mobile device corresponds to a first entity, the physical property corresponds to a second entity, and the computer network address corresponds to a third entity.

4. The method of claim 1 wherein the image data includes an image of the bystander that operates the mobile device.

5. The method of claim 1 wherein the image data includes video data.

6. An information handling system comprising:
   one or more processors;
   a memory coupled to at least one of the processors; and
   a set of computer program instructions stored in the memory and executed by at least one of the processors in order to perform actions of:
     transmitting a single query signal from a mobile device to an electronic tag that corresponds to a physical property, wherein the single query signal activates the electronic tag;
     in response to transmitting the single query signal, receiving, at the mobile device, a first electronic message from the activated electronic tag, wherein the first electronic message includes a computer network address and also includes a unique property identifier corresponding to the physical property;
     receiving a note from a bystander through a user interface window on the mobile device;
     activating a camera on the mobile device in response to receiving the first message;
     transmitting a second message from the mobile device to the computer network address included in the first electronic message, wherein the second message includes the unique property identifier, the note, and image data captured by the activated camera;
     receiving the second message at a third party communication gateway system that corresponds to the computer network address;
     identifying, by the third party communication gateway system, an owner of the physical property that corresponds to the unique property identifier; and
     sending a third message from the third party communication gateway system to the owner that includes the image data and a property description corresponding to the physical property.

7. The information handling system of claim 6 wherein at least one of the one or more processors perform additional actions comprising:
   receiving a response from the owner of the physical property at the third party communication gateway system; and
   sending the response to the mobile device, wherein the third message and the response are both bilaterally anonymous between the bystander that operates the mobile device and the owner of the physical property.

8. The information handling system of claim 6 wherein:
   the electronic tag is a near field communication (NFC) tag that is energized through magnetic induction from a the single query generated by the mobile device when the mobile device is placed in proximity to the NFC tag; and
   the mobile device corresponds to a first entity, the physical property corresponds to a second entity, and the computer network address corresponds to a third entity.

9. The information handling system of claim 6 wherein the image data includes an image of the bystander that operates the mobile device.

10. The information handling system of claim 6 wherein the image data includes video data.

* * * * *